T. A. EDISON.
RECORDING TELEPHONE.
APPLICATION FILED SEPT. 15, 1905.
1,012,250.
Patented Dec. 19, 1911.
3 SHEETS—SHEET 1.
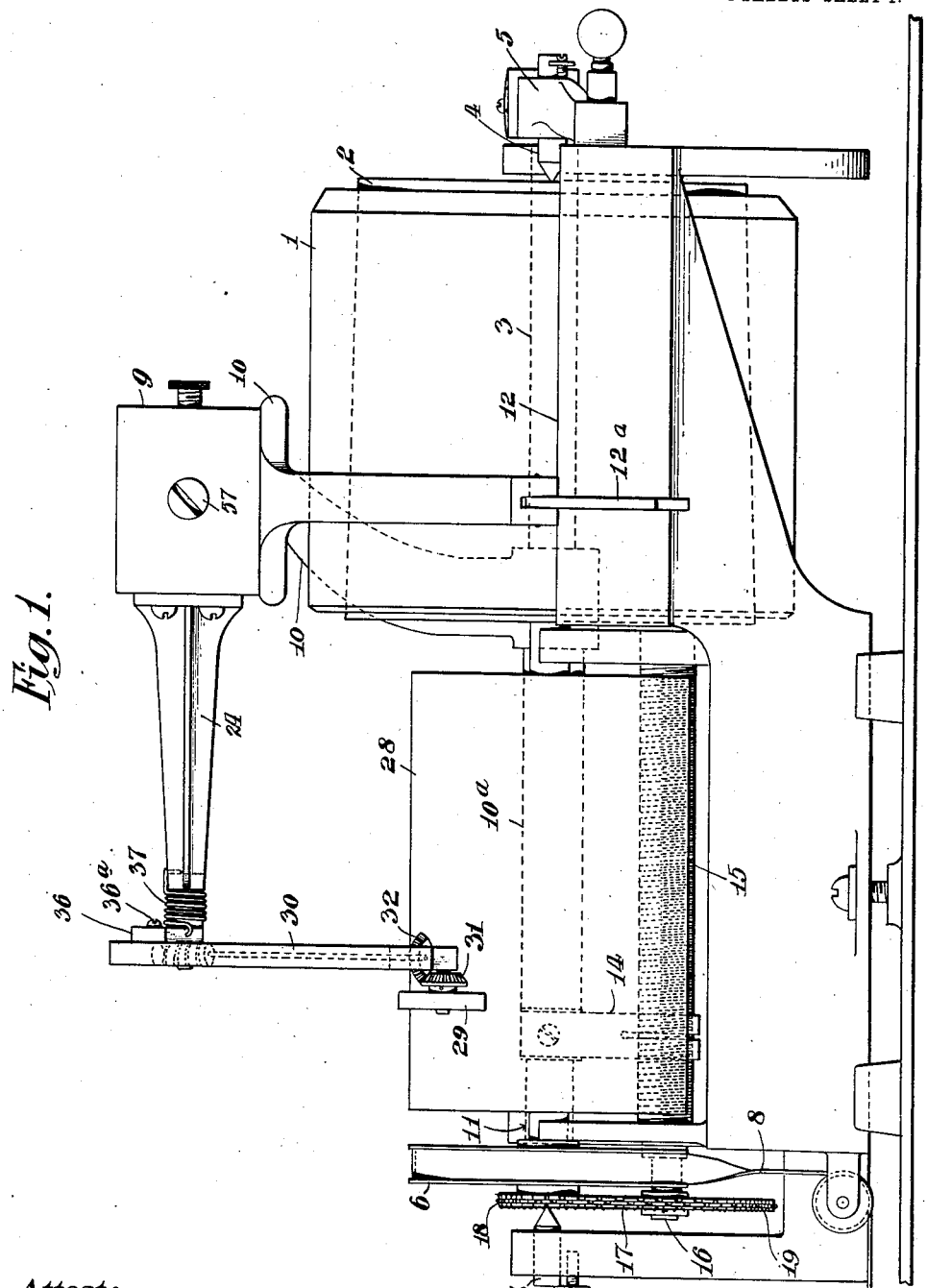

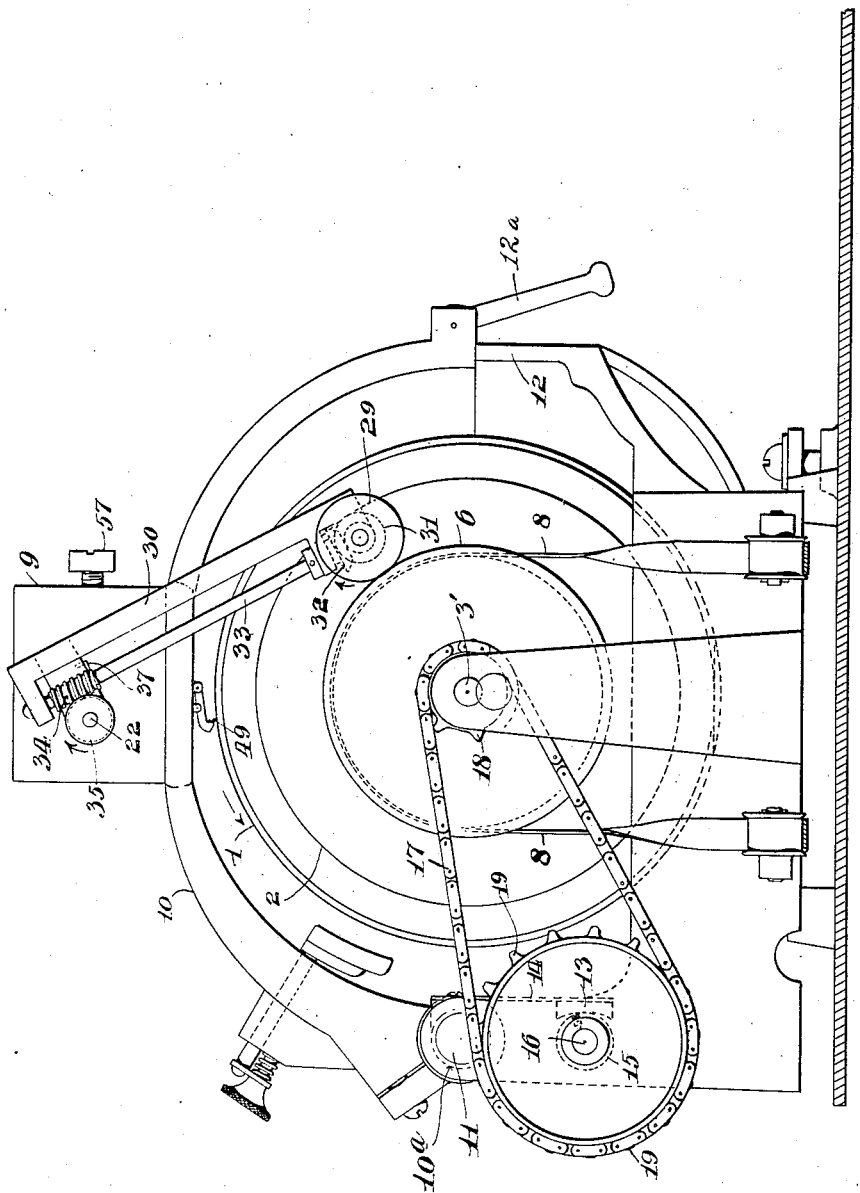

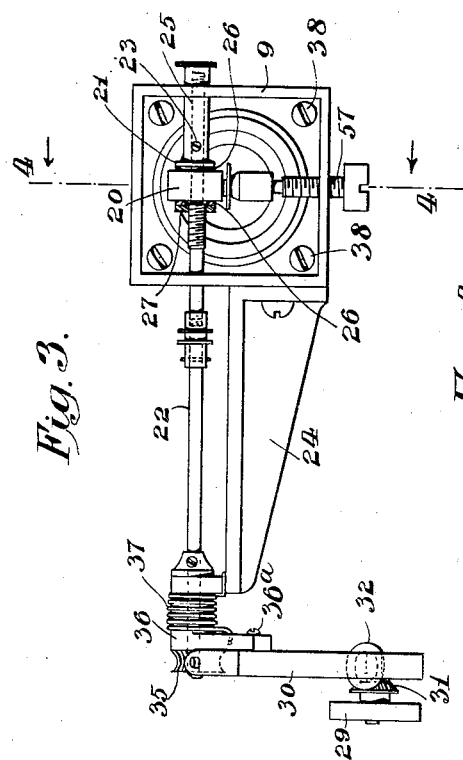
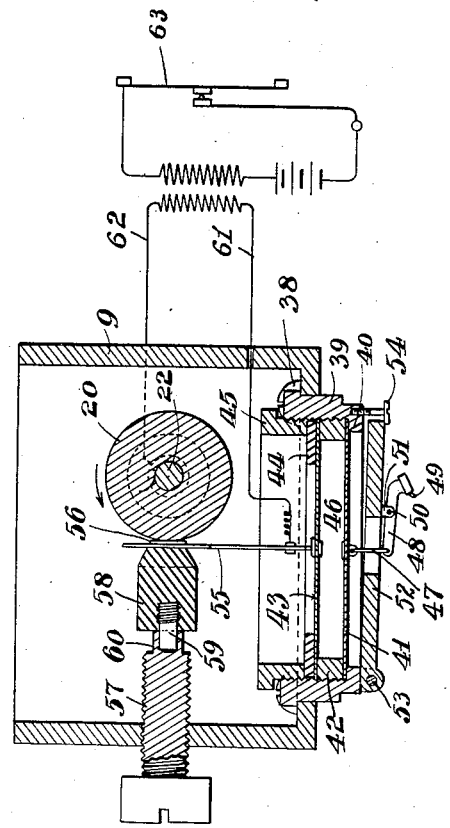

UNITED STATES PATENT OFFICE.

THOMAS A. EDISON, OF LLEWELLYN PARK, ORANGE, NEW JERSEY, ASSIGNOR TO THOMAS A. EDISON, INCORPORATED, OF WEST ORANGE, NEW JERSEY, A CORPORATION OF NEW JERSEY.

RECORDING-TELEPHONE.

1,012,250.      Specification of Letters Patent.      Patented Dec. 19, 1911.

Application filed September 15, 1905. Serial No. 278,549.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Recording-Telephones, of which the following is a description.

My invention relates to telephones and has for its object the provision of means whereby the electrical vibrations or undulations which are received over the line may be recorded phonographically, whereby a record is formed which may be used in any ordinary phonograph, and the message repeated at any future time.

My invention relates more particularly to that form of a telephonic receiver described and shown in U. S. Letters Patent No. 221,957 granted to me on November 25, 1879, wherein a friction wheel formed of chalk or other suitable finely divided non-conducting material or porous body having capillary pores, is moistened with a suitable solution such as caustic alkali and a friction member such as a flat spring is pressed upon the chalk with a considerable pressure, the said spring being connected to a suitable diaphragm and the friction wheel being slowly rotated. The line wire is connected so that the current passes through the spring, frictional contact and friction wheel and causes the amount of friction between the friction member and friction wheel to vary in response to the electric waves or undulations, thereby throwing the diaphragm into vibrations corresponding thereto.

The present invention has for its object the application of such a telephone receiver to mechanism whereby the mechanical vibrations of the diaphragm thus produced may be utilized to produce a phonographic record in the form of a helical or spiral groove and more particularly the supporting of the friction wheel and diaphragm on a traveling carriage, and the driving of said wheel from a stationary motor used also for driving the carriage.

Reference is hereby made to the accompanying drawing forming part of this specification and in which—

Figure 1 is a front elevation illustrating the telephonic receiver and recording mechanism; Fig. 2 is an end elevation of the same; Fig. 3 is a detail plan view of the telephonic receiver and a portion of the mechanism for driving the friction wheel; Fig. 4 is a section on line 4—4 of Fig. 3; and shows also the electrical connections.

In all the above views corresponding parts are designated by the same reference numerals.

The recording surface may be a cylinder 1 of suitable material for receiving a phonographic record and the mechanism for supporting and rotating said cylinder may be similar to the parts of an ordinary phonograph comprising a tapered mandrel 2 on which the cylinder 1 is held by frictional engagement and carried by a shaft 3 supported at its end by pivot pins 3' and 4, the latter being carried by an end gate 5, said shaft being driven by means of a pulley 6 and belt 8 driven from any suitable source of power, such as a spring or electric motor.

The telephonic receiver comprises a body 9 mounted upon a traveling carriage which consists of an arched member 10 whose rear end is clamped to a sleeve $10^a$ sliding on a rod 11, and whose forward end rests upon a straight edge 12, a lift lever $12^a$ being provided for elevating said end. The arm 10 and sleeve $10^a$ are given a progressive movement toward the right, Fig. 1, by a feed nut 13 carried by a spring arm 14 secured to the sleeve $10^a$ and engaging a screw 15 carried by or integral with a shaft 16 driven from the main shaft 3 by means of a chain 17 passing over sprockets 18 and 19. The receiver also comprises a friction wheel 20 of chalk or other suitable material, carried on a driving shaft 22, which is journaled in the walls of the body 9 and a bracket 24 secured thereto. A sleeve 25 having a collar 21 is secured to the shaft 22 by a set screw 23. Washers 26 are placed on each side of the wheel 20 and the whole clamped against the collar 21 by a nut 27 threaded on the shaft 22 (see Fig. 3).

The friction wheel driving mechanism comprises a cylindrical drum 28 which is fixed to the shaft 3 and rotates therewith. A drive roller 29 is journaled at one end of a swinging arm 30 and carries a bevel gear 31 which meshes with a similar gear 32, carried at the lower end of the shaft 33, which is journaled in the arm 30. The upper end of the shaft 33 is provided with a worm 34 which engages a worm wheel 35 on the end of the shaft 22. The arm 30 is rigidly secured to a block 36 (as by a screw 36ª) and said block is mounted on the shaft 22 so as to permit the latter to freely rotate. In order to provide a good frictional driving contact between the roller 29 and drum 28, a coil spring 37 is arranged between the block 36 and bracket 24 and the ends thereof engage the said block and bracket respectively, thus pressing the roller 29 firmly against the drum 28. It will be observed that as the carrier arm 10 travels toward the right (Fig. 1), the roller 29 will at all times bear against the drum 28, pursuing a helical path with respect to the surface thereof and maintaining a constant speed.

The body 9 is secured to the arm 10 by screws 38 and carries a diaphragm holder in the form of a ring 39. The said ring is provided with a seat 40 against which a diaphragm 41 of glass or other suitable material is clamped by a ring 42 threaded within the ring 39. The upper surface of the ring 42 forms a seat for a second diaphragm 43 which may also be of glass, and the same is clamped against its seat by a washer 44 and clamping ring 45 threaded in the ring 39. Between the diaphragm 41 and 43 is an air space 46. The diaphragm 41 is connected by a link 47 to one end of a lever 48 whose opposite end carries a recording stylus 49 preferably of sapphire and of a shape commonly used in phonographic recording. The lever 48 is pivoted at 50 to the lug or lugs 51 projecting downwardly from the compensating weight 52 which is pivoted at 53 to a lug projecting downward from the ring 39 and is supported at its free end by a screw 54 so as to be capable of a slight vertical movement in a well known manner, to compensate for irregularities in the surface or shape of the cylinder 1. Secured to the diaphragm 43 in any suitable manner is a spring arm 55 which carries near its free end a small contact plate 56 of platinum or other suitable material. The plate 56 is pressed frictionally and elastically against the wheel 20 by means of an adjusting screw 57 threaded in one wall of the body 9, and engaging a block of soft rubber 58 bearing against the arm 55, the block 58 being secured in position by means of a pin or stud 59 embedded therein and engaging a socket 60 in the end of the screw 57. The telephonic line wires 61 and 62 over which the electric undulations are received are connected respectively to the arm 55 and shaft 22.

The message is spoken into the telephonic transmitter 63 in the usual manner, and the current induced thereby is transmitted over the wires 61 and 62 to the receiver. The main shaft 3 being driven by its motor, the arm 10 is lowered so as to bring the stylus 49 into engagement with the surface of the record cylinder 1 and the friction wheel 20 is given a constant rotary movement by means of the roller 29 bearing on the drum 28 and driving the shaft 22 through the intermediate gearing. The friction block 56 being pressed against the wheel 20 with considerable pressure, friction will be created which will exert a thrust upon the arm 55, thereby placing the diaphragm 43 under elastic stress. As the strength of the current passing through the block 56 and wheel 20 varies, the amount of friction will vary. Consequently, the diaphragm 43 will be periodically relieved from the thrust of the arm 55, being thus caused to vibrate in accordance with the undulations of the electric current. By providing an air chamber 46, between the two diaphragms as explained, and by connecting the stylus 49 to the diaphragm 41, an elastic cushion is formed which transmits the vibrations of the diaphragm 43 to the diaphragm 41, while at the same time any relatively slow and extreme movements to which the diaphragm 43 may be subjected due to abnormalities in the electric circuit, will not be transmitted, or at least completely transmitted to the diaphragm 41 and in consequence the vibrations recorded on the cylinder 1 will be more nearly representative of sound vibrations. At the same time it will be understood that a single diaphragm may be employed, and also that the lever 48 may be connected directly with the spring arm 55, in which case both diaphragms will be omitted. The entire telephonic receiver travels with the carrier arm 10 along the surface of the recording cylinder 1, whereby a record will be produced in the form of a spiral groove whose pitch is equal to that of the feed screw 15, and whereby a message of considerable length may be recorded by the instrument.

Having now described my invention, what I claim as new and desire to secure by Letters Patent is as follows:

1. In a recording telephone, the combination with the transmitter and line conductors, of a traveling phonographic recording surface, a carrier movable across said surface, a phonographic-stylus and friction wheel carried by the carrier, means comprising a friction member pressing on said wheel for vibrating said stylus, and connections whereby the line current is passed through the frictional contact, substantially as set forth.

2. In a recording telephone, the combination with the transmitter and line conductors, of a traveling phonographic recording surface, a carrier movable across said surface, a phonographic-stylus and friction wheel carried by the carrier, means comprising a friction member pressing on said wheel for vibrating said stylus, connections whereby the line current is passed through the frictional contact, and means for driving said friction wheel, substantially as set forth.

3. In a phonic apparatus, the combination of a rotating mandrel, a carriage movable longitudinally thereof, a shaft mounted on the carriage, a friction wheel carried by said shaft, a rotating drum, a roller carried by said carriage and pressed against the surface of said drum and driving connections between said roller and shaft, substantially as set forth.

4. In a phonic apparatus, a rotating friction wheel, a diaphragm, a friction member connected to said diaphragm and pressing against said friction wheel, a second diaphragm, an air chamber between said diaphragms, a phonographic recording surface, and a recording stylus in operative engagement with said surface and connected to said second diaphragm, and means representative of sound vibrations for varying the friction between the friction member and friction wheel, substantially as set forth.

5. In a recording telephone, the combination with a rotating friction wheel, a friction surface in contact therewith, means for electrically varying the friction in correspondence to sound waves whereby said friction surface will partake of amplified vibrations and means for recording phonographically the vibration developed by said friction surface, substantially as and for the purposes set forth.

6. In a phonic apparatus, the combination of a rotating mandrel, a carriage movable longitudinally thereof, a shaft mounted on the carriage, a friction wheel carried by said shaft, a rotating drum, a swinging arm carried by said carriage, a friction roller carried by said arm and pressed against the surface of said drum, and driving connections between said roller and shaft for rotating said shaft from the roller, substantially as set forth.

This specification signed and witnessed this 14th day of September, 1905.

THOS. A. EDISON.

Witnesses:
FRANK L. DYER,
MINA C. MACARTHUR.